April 13, 1965 V. GRADECAK 3,177,654
ELECTRIC AEROSPACE PROPULSION SYSTEM
Filed Sept. 26, 1961 3 Sheets-Sheet 1

INVENTOR.
VJEKOSLAV GRADECAK
BY Knox & Knox

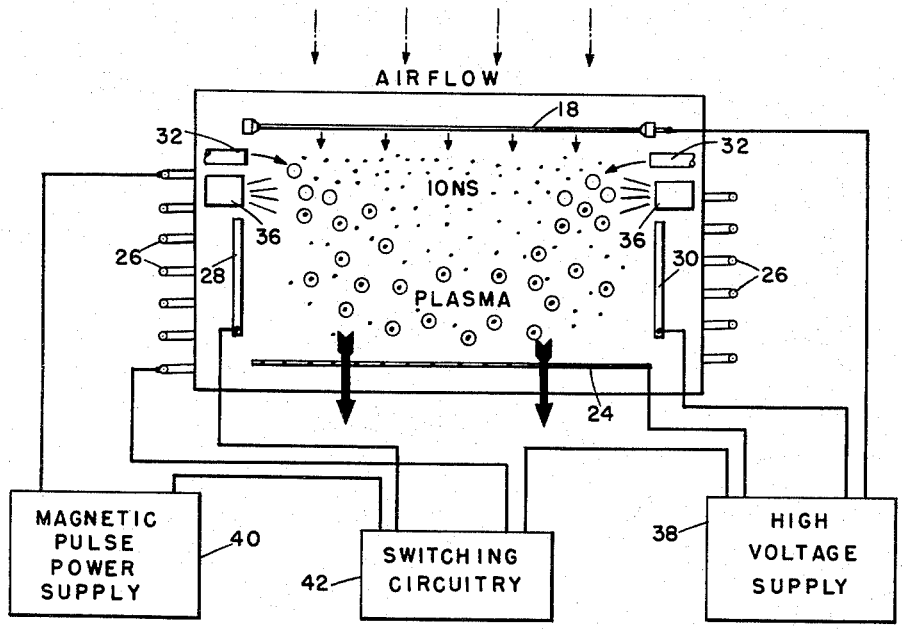
Fig. 4
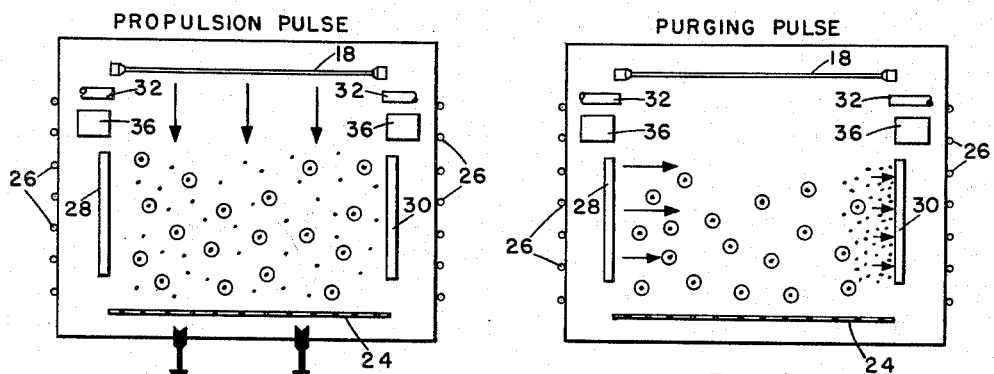
Fig. 5
Fig. 6
INVENTOR.
VJEKOSLAV GRADECAK
BY Knox & Knox April 13, 1965     V. GRADECAK     3,177,654
ELECTRIC AEROSPACE PROPULSION SYSTEM
Filed Sept. 26, 1961     3 Sheets-Sheet 3

INVENTOR.
VJEKOSLAV GRADECAK
BY Knox & Knox

# United States Patent Office 3,177,654
Patented Apr. 13, 1965

3,177,654
ELECTRIC AEROSPACE PROPULSION SYSTEM
Vjekoslav Gradecak, El Cajon, Calif., assignor to Ryan Aeronautical Company, San Diego, Calif.
Filed Sept. 26, 1961, Ser. No. 140,919
12 Claims. (Cl. 60—35.5)

The present invention relates generally to propulsion and specifically to an electric aerospace propulsion system.

Present systems and proposals for space vehicles mainly rely on the thrust of a large booster rocket for the initial stage of the journey, the booster being dropped when exhausted and another source of thrust used for continued travel. For orbital flight and limited maneuvering chemical fueled systems are adequate, but for extended space flight it is necessary to have thrust available for long periods. Once in space, a small amount of thrust is sufficient to accelerate and guide a vehicle and proposed systems include the use of solar energy, photon propulsion and electric propulsion. The electric propulsion systems fall broadly into three categories: the electrothermol jet in which a gaseous propellant is electrically heated and thermodynamically accelerated; the ion rocket in which ions are electrostatically accelerated; and the magnetohydrodynamic system in which a plasma is accelerated by an electromagnetic field. All of these systems have specific impulses considerably higher than chemical rockets, but the thrust is very limited and suitable for use in space only.

The ideal propulsion system would have a high specific impulse or long duration of useful thrust, with sufficient thrust to lift a vehicle directly from the ground and continue the flight into space. This would eliminate the large boosters and high acceleration and vibration stresses normally associated with space vehicle launching. Such a propulsion system would also have to be capable of operating in atmosphere or in space and would thus provide for controlled re-entry into atmosphere without aerodynamic heating caused by high speed re-entry and frictional braking.

The primary object of this invention, therefore, is to provide a propulsion system for enabling controlled flight in the atmosphere, continuing into space without changing the basic operation of the system and achieving extended space flight.

Upon future reinfinement of the known electrical generating systems, it is contemplated that the electric propulsion systems described hereafter might be adapted for use in lift-off and ground landing techniques.

Another object of this invention is to provide an electric propulsion system in which extremely high voltages are used to ionize a fluid in a coronal discharge field, the ionized fluid being accelerated by extremely high powered magnetic pulses which produce a pinch effect in the propulsion chamber.

A further object of this invention is to provide an electric propulsion system in which the propulsion unit chamber is open at both ends so that in atmosphere, air is admitted to the chamber and ionized to form plasma, the un-ionized air being entrained by the accelerated plasma and adding to the mass flow to increase thrust.

It is another object of this invention to provide an electric propulsion system wherein a supply of colloids is used as a source of plasma for operation in space, the ionization being enhanced by an auxiliary source of radiation in the vicinity of the coronal discharge.

Another object of this invention is to provide an electric propulsion system which may be operated as a single unit or in multiple units distributed throughout an aerospace vehicle, the polarity of alternate units being reversed to avoid build-up of a space charge in the vicinity of the vehicle.

A final object of this invention is to provide a propulsion system in which the unit is purged of excess electrons between propulsion pulses, to avoid arcing between electrodes.

With these and other objects in view, this invention resides in the novel construction, combination and arrangement of elements, as will be hereinafter described in the specification, particularly pointed out in the claims, and illustrated in the drawings which form a material part of this disclosure, and in which:

FIGURE 4 is a diagrammatic view of the propulsion system;

FIGURE 5 is a diagrammatic view of the propulsion pulse stage;

FIGURE 6 is a diagrammatic view of the operation between propulsion pulses;

Similar numerical designations indicate similar elements and portions throughout the various views of the drawings.

Structure of propulsion unit

Figure 1:
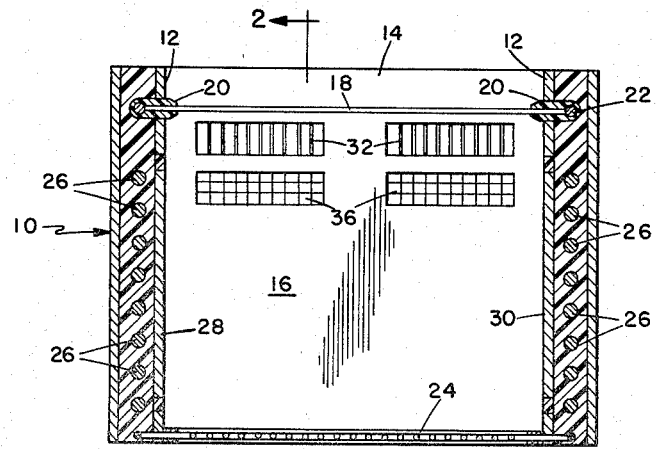
FIGURE 1 is a transverse sectional view of a single propulsion unit.
Figure 2:
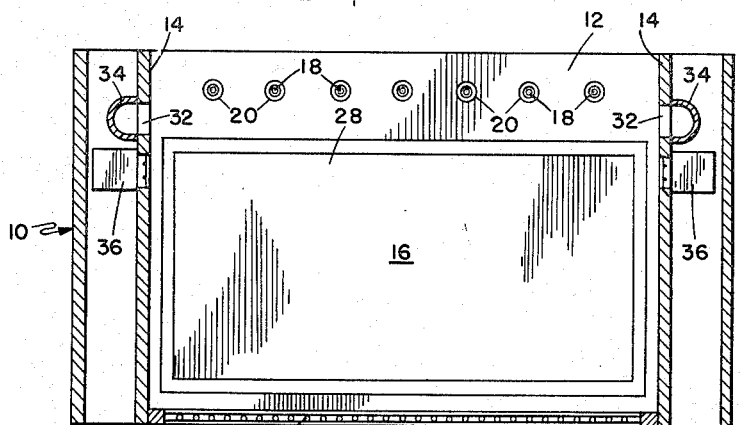
FIGURE 2 is a sectional view taken on the line 2—2 of FIGURE 1.
Figure 3:
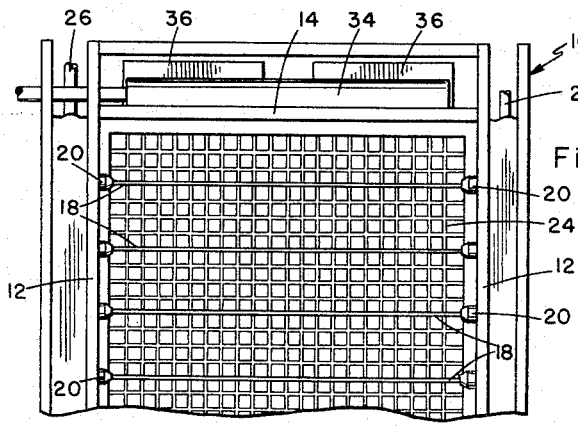
FIGURE 3 is a partial top plan view of the unit.

Referring now to FIGURES 1–3, the propulsion unit 10 is illustrated as a rectangular, box-like structure having side walls 12 and end walls 14 enclosing a chamber 16 which is substantially open at the top and bottom. The walls are hollow or constructed of suitable thickness to enclose wiring and minor accessories associated with the unit. Extending between the upper ends of side walls 12 are spaced, parallel discharge electrodes 18, which may be metallic rods supported between insulators 20 and connected at one end at least to a common high voltage conductor 22. Across the lower end of chamber 16 is a screen or mesh-like grid 24. Within the side walls 12 are vertically spaced electromagnetic coils 26 which may be wrapped completely around the chamber 16 for a single unit, or extend from each end as part of a multiple unit assembly having a common electromagnet portion.

Mounted on or in the inner faces of side walls 12 are electrodes 28 and 30 in opposition to each other. Within end walls 14 and directly below the electrodes 18 are inlets 32 to which is connected a supply duct 34, for injecting colloids into the chamber. Below the inlets 32 are radiation sources 36, from which the fluid and colloids in the chamber are subjected to radiation. The structure may vary considerably in detail and configuration, according to size and specific installation, the arrangement illustrated merely being an example.

Operation of propulsion unit

As illustrated in FIGURE 4, the electrodes 18 are connected to one side of a high voltage supply 38 and the grid 24 to the other side thereof, to provide a high potential from top to bottom of chamber 16. To achieve the desired results a potential on the order of a million volts or more is contemplated. The high voltage causes coronal discharge from electrodes 18 which ionizes gas or fluid in the vicinity. In atmosphere, air is used as the working fluid and the upper portion of the chamber 16 is filled with a mixture of air and ions, the ions being attracted to grid 24, which is of opposite polarity. When a pulse of high current is applied to the electromagnetic coils 26 from a power supply 40, a magnetic field is produced in which the lines of force are effective axially through the chamber. This drives the ions downwardly with considerable acceleration, the phenomenon being commonly known as "pinch effect." The plasma formed by the working fluid and the ions is thus driven downwardly through the grid 24, producing thrust by reaction. A considerable quantity of air is entrained by the plasma motion and greatly adds to the mass flow, so that appreciable thrust can be obtained in atmosphere. In addition to the high voltage, extremely high electromagnetic power pulses are contemplated, on the order of several hundred thousand amperes. Since the actual power supply may vary, no specific type is illustrated. For example, an electrostatic generator could provide the high voltage necessary, while a capacitor bank could supply the high current pulses.

Since each magnetic pulse may not be sufficient to drive a chamber full of plasma completely out through grid 24, the accumulation of excess electrons in the chamber could cause a breakdown path and initiate arcing between electrodes 18 and the grid. This would stop the plasma flow and cause loss of thrust. To avoid such an occurrence, an electrical potential is established between plate electrodes 28 and 30 which is orthogonal to the electromagnetic field and causes excess electrons to be attracted to one or other of the plate electrodes, depending on polarity.

The necessary voltage can be obtained, with suitable reduction, from the high voltage supply 38. To ensure proper purging of excess electrons at the proper time, the circuits to the electromagnetic coils 26 and plate electrodes 28 and 30 are coupled to a high speed switching circuit 42 to operate alternately. Thus in the propulsion pulse illustrated in FIGURE 5, the plasma is driven downwardly by the electromagnetic field, while in the purging pulse illustrated in FIGURE 6, the excess electrons are swept to the plate electrode 30. The switching means may be electronic, electromechanical, or any other suitable type depending on the operating frequency.

It will be noted that no specific polarities are indicated. Either positive or negative ions can be produced at electrodes 18, according to the polarity of the electrodes, and attracted toward the oppositely polarized grid 24. Also, the field between plate electrodes 28 and 30 can be in either direction.

At extreme altitudes where the air is rarified, or in space, working fluid must be provided from a suitable supply. The working fluid may be in the form of colloids, metallic powders, hygroscopic salts, or gases, which can be injected into the chamber 16 through inlets 32. Electrons become attached to the colloid molecules and form charged particles of low ionic mobility and considerably larger than ionized air particles, thus providing a high mass plasma which is readily acted upon by the electromagnetic field. In FIGURES 4-6 the colloid particles are indicated by open circles and the electrons by dots, the circles containing dotes representing charged particles.

To assist in ionization of the colloids, radiation is used to make the colloidal particles unstable and facilitate capture of electrons. The radiation may be from ultraviolet, X-ray, or gamma ray sources, radio frequency excitation, or the like. The sources 36 are thus indicated in box form and are disposed immediately below the inlets 32 to irradiate the emerging particles.

The radiation sources 36 may be used to enhance ionization of air without colloid injection, or colloids may be injected during atmosphere travel for added thrust when necessary.

Application to aerospace vehicle

Figure 7:
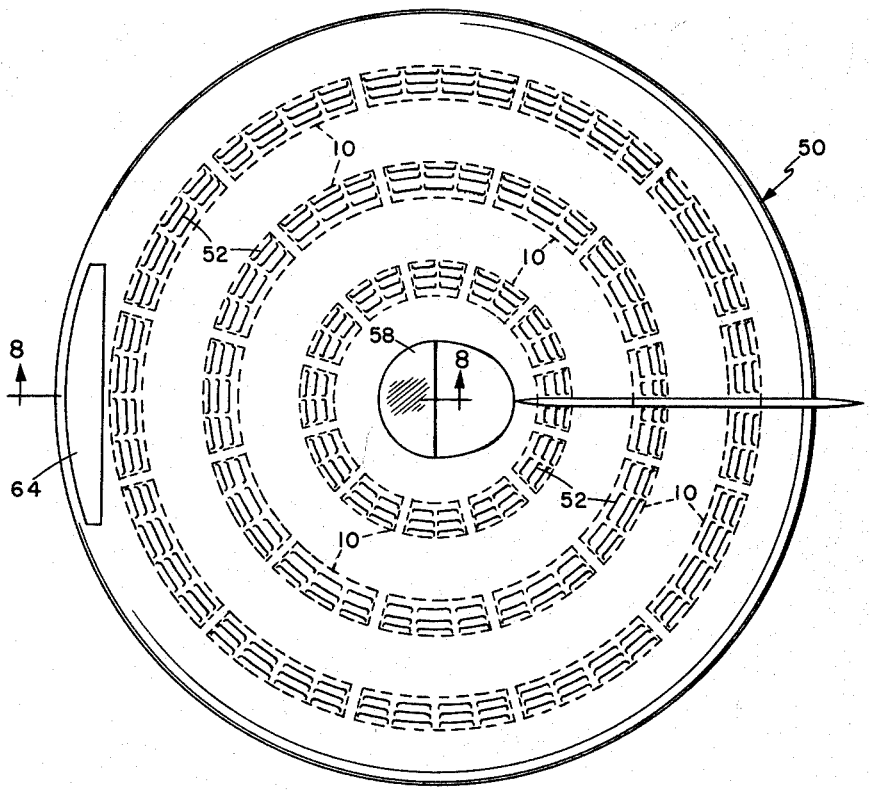
FIGURE 7 is a top plan view of an aerospace vehicle incorporating multiple propulsion units.

The propulsion unit is adaptable to many different types of vehicles for travel in atmosphere or in space, such as aircraft, orbital satellites, or interplanetary craft. The vehicle illustrated in FIGURES 7 and 8, by way of an example, is a disc shaped aerospace craft indicated generally at 50. A number of propulsion units 10, each constructed as previously described, are distributed in concentric rings within the discoid body, the upper surface of which is provided with louvers 52 to admit air. The louvers are indicated as fixed but could be adjustable and have closure means. The propulsion units 10 have individual divergent nozzles 54 opening downwardly through the lower surface of the craft, the openings being fitted with pivotal vanes 56 which can be adjusted selectively to various angles or closed completely.

The electromagnetic coils 26 can be continuous around a complete ring of propulsion units as one large coil, or wound around individual units, according to the degree of control required. The coils 26 extend downwardly around the nozzles 54 to continue the plasma acceleration as long as possible for maximum efficiency.

In the central portion of the craft is a cabin 58 containing all necessary controls and instruments, the arrangement being variable. Also in the central portion is a power unit 60, which can be a high speed gas turbine, or some similar source of power, to drive the electrical generator 62 which supplies the working power for the vehicle. A nuclear power source could be used for long range operation, although the turbine has a distinct advantage in that the exhaust gases may be used as a working fluid to produce plasma in the propulsion units. The various spaces and bays between units may be used to contain electrical apparatus, capacitor banks, controls, colloids, fuel and life support necessities such as oxygen and water.

Figure 8:
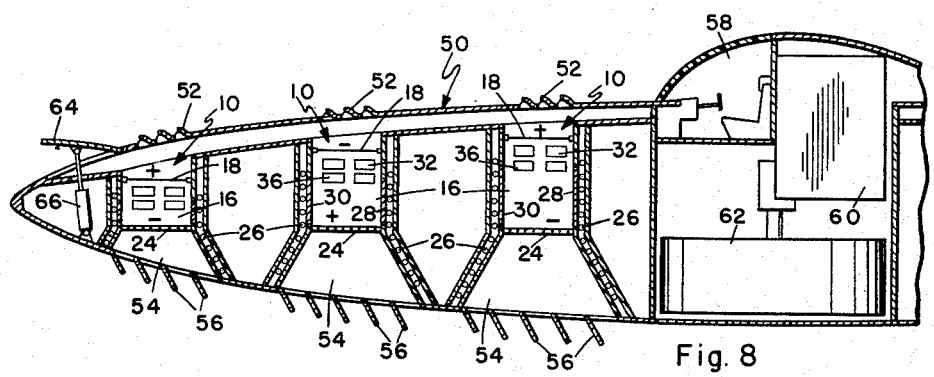
FIGURE 8 is an enlarged sectional view taken on the line 8—8 of FIGURE 7.

If all of the propulsion units are of similar polarity and producing particles of similar electrical charge, the accumulation of plasma downstream of the vehicle will cause a high potential space charge which would prevent ejection of further charged particles and destroy thrust. Schemes have been proposed to inject oppositely charged particles into exhaust streams to neutralize the electrical charge, but the problems involved are many. With a multiple unit propulsion system as illustrated, space charge build-up is avoided by making alternate units operate at opposite polarity as indicated in FIGURE 8, the downstream mixing providing charge neutralization.

To ensure an adequate supply of air in forward flight in atmosphere, the leading edge of the upper surface of the craft is fitted with a hinged flap 64 actuated by a jack 66, or similar mechanism. When flap 64 is open, air is admitted under ram effect and distributed to the various propulsion units. The lower vanes 56 may be deflected to direct the plasma flow rearwardly for forward propulsion, or forwardly for deceleration. With vanes 56 vertical, the craft can be made to hover, ascend, or decend, according to the power applied to the propulsion units. The vanes can be mechanically, electrically, or fluid operated, with suitable control means for the pilot, such systems being well known.

At low altitudes, or in dense atmosphere, the pulsed magnetic field may be operated at relatively low frequency, while in rarified atmosphere, or in space, high frequency pulsing is desirable. The pulsing prevents build-up of a charged short circuit path and subsequent arcing, particularly in a near vacuum where electrical resistance is low. The extremely high voltages and high magnetic pulse currents contemplated provide thrust several orders of magnitude higher than previously proposed systems, and a multiplicity of units can produce an appreciable total thrust over a wide surface area.

It should be understood that the propulsion system may be installed in vehicles of widely varying configurations with proper distribution of the individual units. If the units are independently operable, or at least some of the units adjacent the periphery of the vehicle, directional control may be achieved by differential thrust operation of appropriate units.

Advantages

Since the propulsion units are operable with a wide variety of working fluids, a vehicle so equipped can maneuver in atmosphere and climb to any altitude. Transition from atmosphere to space is accomplished without any change in the basic propulsion system and without the need for auxiliary propulsion means. If a turbine is used as a primary power source, the exhaust gases provide a working fluid in space and colloids can be added if required. Thrust is critical only in atmosphere and to overcome gravitational attraction. In orbit or in space, very little thrust is required to maintain speed, accelerate, or decelerate at a comfortable rate.

The system is particularly suitable for very large, low density vehicles, in which a large number of propulsion units can be distributed over a considerable area. Spacious satellites could be placed directly in orbit fully assembled and equipped, or space vehicles could be propelled on fully controlled interplanetary trips. Landings on other planets might be accomplished by using the existing planetary atmosphere to provide a working fluid.

In returning to earth, re-entry into atmosphere might be made in a gradual, controlled manner, avoiding frictional heating and violent deceleration. On entering atmosphere, air is again used as a working fluid.

It is understood that minor variation from the form of the invention disclosed herein may be made without departure from the spirit and scope of the invention, and that the specification and drawing are to be considered as merely illustrative rather than limiting.

I claim:

1. An ionized jet propulsion system, comprising:
   an open ended chamber;
   a source of ions comprising a corona field emission electrode at one end of said chamber;
   a grid electrode at the other end of said chamber;
   a source of high voltage connected between said grid electrode and said corona field emission electrode;
   electromagnetic field producing means around said chamber to provide a field, the lines of force of which are substantially axially divergent of said chamber;
   a pulsed source of power connected to said field producing means to drive ions toward said grid electrode;
   a source of working fluid directed into said chamber to form a plasma with the ions therein;
   and a means to produce an electrical field transversely of said chamber between pulses of the electromagnetic field to purge excess electrons from the chamber.

2. An ionized jet propulsion system, comprising:
   an open ended chamber;
   a source of ions comprising a corona field emission electrode at one end of said chamber;
   a grid electrode at the other end of said chamber;
   a source of high voltage connected between said grid electrode and said corona field emission electrode;
   electromagnetic field producing means around said chamber to provide a field, the lines of force of which are substantially axially divergent of said chamber;
   a pulsed source of power connected to said field producing means to drive ions toward said grid electrode;
   a source of working fluid directed into said chamber to form a plasma with the ions therein;
   means to produce an electrical field transversely of said chamber to purge excess electrons therefrom;
   and switch means operable to apply said last mentioned electrical field between pulses of the electromagnetic field.

3. An ionized jet propulsion system, comprising:
   an open ended chamber;
   a source of ions comprising a corona field emission electrode at one end of said chamber;
   a grid electrode at the other end of said chamber;
   a source of high voltage connected between said grid electrode and said corona field emission electrode;
   electromagnetic field producing means around said chamber to provide a field, the lines of force of which are substantially axially divergent of said chamber,
   a pulsed source of power connected to said field producing means to drive ions toward said grid electrode;
   a source of working fluid directed into said chamber to form a plasma with the ions therein;
   said source of high voltage providing a potential on the order of one million volts.

4. An ionized jet propulsion system according to claim 3, wherein said pulsed source of power has an output on the order of a hundred thousand amperes.

5. An ionized jet propulsion system, comprising:
   an open ended chamber;
   a source of ions comprising a corona field emission electrode at one end of said chamber;
   a grid electrode at the other end of said chamber;
   a source of high voltage connected between said grid electrode and said corona field emission electrode;
   electromagnetic field producing means around said chamber to provide a field, the lines of force of which are substantially axially divergent of said chamber;
   a pulsed source of power connected to said field producing means to drive ions toward said grid electrode;
   said chamber being exposed to atmosphere, whereby ambient air is entrained by the plasma flow in the chamber.

6. An ionized jet propulsion system, comprising:
   an open ended chamber;
   a source of ions comprising a corona field emission electrode at one end of said chamber;
   a grid electrode at the other end of said chamber;
   a source of high voltage connected between said grid electrode and said corona field emission electrode;
   electromagnetic field producing means around said chamber to provide a field, the lines of force of which are substantially axially divergent of said chamber;
   a pulsed source of power connected to said field producing means to drive ions toward said grid electrode;
   said chamber being exposed to atmosphere, whereby ambient air is entrained by the plasma flow in the chamber;
   said chamber having inlets adjacent said source of ions;
   and means to inject colloids into said chamber through said inlets.

7. An ionized jet propulsion system according to claim 6 and including means to inject colloids into said chamber through said inlets;
   and radiation sources adjacent said inlets to irradiate the colloids and enhance combination thereof with ions from said ion source.

8. In a vehicle, the combination comprising:
   a plurality of ionized jet propulsion units operatively mounted in said vehicle;
   each of said propulsion units comprising an open ended chamber having an outlet end at the surface of the vehicle;
   a source of ions comprising a corona field emission electrode at one end of said chamber;
   a grid electrode at the other outlet end of said chamber;
   a source of high voltage connected between said grid electrode and said corona field emmission electrode;
   electromagnetic field producing means around said chamber to provide a field, the lines of force of which are substantially axially divergent of the chamber;
   a pulsed source of power connected to said field producing means to drive ions toward said grid electrode;
   a source of working fluid directed into said chamber to form a plasma with the ions therein;
   said propulsion units being alternately connected to produce ions of opposite polarity, whereby the combined discharge therefrom is substantially neutral.

9. The combination according to claim 8, wherein said vehicle has air inlets providing ambient air to said propulsion units for entrainment by the plasma flow therein.

10. The combination according to claim 9 and including angularly adjustable flow guiding vanes at the outlet ends of said propulsion units.

11. In a vehicle, the combination comprising:
a plurality of ionized jet propulsion units operatively mounted in said vehicle;
each of said propulsion units comprising an open ended chamber having an outlet end at the surface of the vehicle;
a source of ions comprising a corona field emission electrode at one end of said chamber;
a grid electrode at the other outlet end of said chamber;
a source of high voltage connected between said grid electrode and said corona field emission electrode;
electromagnetic field producing means around said chamber to provide a field, the lines of force of which are substantially axially divergent of the chamber;
a pulsed source of power connected to said field producing means to drive ions toward said grid electrode;
a source of working fluid directed into said chamber to form a plasma with the ions therein;
means to produce an electrical field transversely of said chamber;
switch means connected to operate said last mentioned field between electromagnetic pulses to purge excess electrons from the chamber;
and said propulsion units being alternately connected to produce ions of opposite polarity, whereby the combined discharge therefrom is substantially neutral.

12. In a vehicle, the combination comprising:
a plurality of ionized jet propulsion units operatively mounted in said vehicle;
each of said propulsion units comprising an open ended chamber having an outlet end at the surface of the vehicle;
a source of ions comprising a corona field emission electrode at one end of said chamber;
a grid electrode at the other outlet end of said chamber;
a source of high voltage connected between said grid electrode and said corona field emission electrode;
electromagnetic field producing means around said chamber to provide a field, the lines of force of which are substantially axially divergent of the chamber;
a pulsed source of power connected to said field producing means to drive ions toward said grid electrode;
a source of working fluid directed into said chamber to form a plasma with the ions therein;
said chamber having an extended outlet nozzle;
said electromagnetic field producing means extending around said nozzle;
and said propulsion units being alternately connected to produce ions of opposite polarity, whereby the combined discharge therefrom is substantially neutral.

References Cited by the Examiner
UNITED STATES PATENTS

| | | | |
|---|---|---|---|
| 1,363,037 | 12/20 | Goddard. | |
| 1,687,550 | 10/28 | Ehret | 60—35.5 |
| 2,826,708 | 3/58 | Foster | 60—35.5 |
| 2,880,337 | 3/59 | Langmuir et al. | |
| 2,936,969 | 5/60 | Griffith et al. | 60—35.5 |
| 2,940,689 | 6/60 | Howell | 60—35.5 |
| 2,952,970 | 9/60 | Blackman | 60—35.5 |
| 3,014,154 | 12/61 | Ehlers et al. | 60—35.5 |
| 3,032,978 | 5/62 | Kunen | 60—35.5 |
| 3,041,824 | 7/62 | Berhman | 60—35.6 |
| 3,050,652 | 8/62 | Baldwin | 60—35.5 |
| 3,052,088 | 9/62 | Davis et al. | 60—35.5 |

SAMUEL LEVINE, *Primary Examiner.*